(12) United States Patent
Nakajima et al.

(10) Patent No.: US 12,258,531 B2
(45) Date of Patent: Mar. 25, 2025

(54) REFRIGERATOR OIL, AND WORKING FLUID COMPOSITION FOR REFRIGERATOR

(71) Applicant: ENEOS CORPORATION, Tokyo (JP)

(72) Inventors: Tatsuki Nakajima, Tokyo (JP); Shogo Hashimoto, Tokyo (JP); Hidetoshi Ogata, Tokyo (JP); Yuma Seki, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 18/013,418

(22) PCT Filed: Jul. 7, 2021

(86) PCT No.: PCT/JP2021/025666
§ 371 (c)(1),
(2) Date: Dec. 28, 2022

(87) PCT Pub. No.: WO2022/009931
PCT Pub. Date: Jan. 13, 2022

(65) Prior Publication Data
US 2023/0250354 A1 Aug. 10, 2023

(30) Foreign Application Priority Data
Jul. 8, 2020 (JP) ................. 2020-117803

(51) Int. Cl.
| | | |
|---|---|---|
| *C10M 129/76* | (2006.01) | |
| *C09K 5/04* | (2006.01) | |
| *C10M 169/04* | (2006.01) | |
| *C10N 40/30* | (2006.01) | |

(52) U.S. Cl.
CPC ........... *C10M 129/76* (2013.01); *C09K 5/045* (2013.01); *C10M 169/04* (2013.01); *C09K 2205/126* (2013.01); *C10M 2207/281* (2013.01); *C10M 2207/289* (2013.01); *C10N 2040/30* (2013.01)

(58) Field of Classification Search
None
See application file for complete search history.

(56) References Cited

U.S. PATENT DOCUMENTS

| | | | |
|---|---|---|---|
| 2,560,202 A | 7/1951 | Zimmer et al. | |
| 5,403,503 A | 4/1995 | Seiki et al. | |
| 6,548,457 B1 | 4/2003 | Kaimai et al. | |
| 6,551,523 B1* | 4/2003 | Schnur | C10M 171/008 62/84 |
| 6,692,654 B2* | 2/2004 | Osumi | C10M 105/48 508/501 |
| 6,878,677 B1 | 4/2005 | Sakanoue et al. | |
| 2007/0032391 A1* | 2/2007 | Tagawa | C10M 171/008 508/421 |
| 2011/0240910 A1* | 10/2011 | Carr | C10M 177/00 252/68 |
| 2018/0044607 A1 | 2/2018 | Tada et al. | |
| 2020/0199476 A1* | 6/2020 | Yamaguchi | C10M 107/28 |

FOREIGN PATENT DOCUMENTS

| | | |
|---|---|---|
| CN | 107250332 A | 10/2017 |
| EP | 0 461 262 A1 | 12/1991 |
| EP | 1 088 883 A1 | 4/2001 |
| GB | 656 226 A | 8/1951 |
| GB | 691 346 A | 5/1953 |
| JP | 54-040260 A | 3/1979 |
| JP | 2000-256692 A | 9/2000 |
| JP | 2010-265428 A | 11/2010 |
| KR | 10-2020-0010121 A | 2/2002 |
| KR | 10-2009-0130053 A | 12/2009 |
| KR | 10-2014-0139491 A | 12/2014 |
| WO | 1991/009097 A1 | 6/1991 |
| WO | 2000/063326 A1 | 10/2000 |
| WO | 2015/182173 | 12/2015 |
| WO | 2021/079976 A1 | 4/2021 |

OTHER PUBLICATIONS

ISR issued in International Patent Application No. PCT/JP2021/025666, Sep. 14, 2021, translation.
IPRP issued in International Patent Application No. PCT/JP2021/025666, Jan. 10, 2023, translation.
Office Action issued in EP Patent Application No. 21838195.2, Oct. 19, 2023.

* cited by examiner

*Primary Examiner* — Vishal V Vasisth
(74) *Attorney, Agent, or Firm* — GREENBLUM & BERNSTEIN, P.L.C.

(57) ABSTRACT

One aspect of the present invention is a refrigerating machine oil containing: a base oil; and a partial ester of a carboxylic acid and a polyhydric alcohol, wherein the carboxylic acid contains an unsaturated carboxylic acid.

14 Claims, No Drawings

REFRIGERATOR OIL, AND WORKING FLUID COMPOSITION FOR REFRIGERATOR

This application is a 371 of PCT/JP2021/025666, filed Jul. 7, 2021.

TECHNICAL FIELD

The present invention relates to a refrigerating machine oil, and a working fluid composition for a refrigerating machine.

BACKGROUND ART

Conventionally, refrigerating machine oil has been used in refrigerating machines such as air conditioning equipment such as room air conditioners and package air conditioners; home freezers; industrial refrigerating machines; and car air conditioners. Such refrigerating machines contain a refrigerant circulation system containing a compressor, a condenser, an expansion mechanism (an expansion valve, a capillary), an evaporator, and the like, and cooling is performed by circulating a refrigerant in the refrigerant circulation system.

Compressors for refrigerating machines contains rotary compressors, piston-crank compressors, and the like. For example, in a piston-crank type compressor, a rotary motion of a motor is converted into a reciprocating motion by a connecting rod, and a piston coupled to the connecting rod is reciprocated to compress a refrigerant. The refrigerating machine oil is sealed in a compressor together with a refrigerant, and lubricates sliding members such as a connecting rod and a piston. For example, Patent Document 1 discloses a refrigerating machine oil containing a specific ester additive.

CITATION LIST

Patent Document

[Patent Document 1] International Publication No. 2015/182173

SUMMARY OF INVENTION

Technical Problem

One aspect of the present invention is to provide a refrigerating machine oil having excellent antiwear property.

Solution to Problem

The present inventors have found that when an ester of polyhydric alcohol and a carboxylic acid is added to a base oil, a refrigerating machine oil having excellent antiwear property can be obtained by using a carboxylic acid containing an unsaturated carboxylic acid as the carboxylic acid and using a partial ester as the ester. That is, the present inventors have found that excellent antiwear property can be obtained by using a partial ester of a carboxylic acid containing an unsaturated carboxylic acid and a polyhydric alcohol (hereinafter also referred to as "unsaturated carboxylic acid partial ester"), as compared with the case where a partial ester of a carboxylic acid containing no unsaturated carboxylic acid (containing only a saturated carboxylic acid) and a polyhydric alcohol (hereinafter also referred to as "saturated carboxylic acid partial ester") is used or the case where only a complete ester is used without using an unsaturated carboxylic acid partial ester. In particular, it is surprising that even if the types of the polyhydric alcohol and carboxylic acid constituting the ester are the same, there is a difference in antiwear property between the case where the refrigerating machine oil contains an unsaturated carboxylic acid partial ester and the case where the refrigerating machine oil contains no unsaturated carboxylic acid partial ester (contains only a complete ester).

One aspect of the present invention is a refrigerating machine oil containing: a base oil; and a partial ester of a carboxylic acid and a polyhydric alcohol, wherein the carboxylic acid contains an unsaturated carboxylic acid.

The unsaturated carboxylic acid may have 12 or more carbon atoms.

The polyhydric alcohol may contain pentaerythritol. The partial ester may contains a monoesters of pentaerythritol, a diester of pentaerythritol, and a triester of pentaerythritol.

The carboxylic acid may further contain a saturated carboxylic acid. The saturated carboxylic acid has 12 or more carbon atoms.

Another aspect of the present invention is a working fluid composition for a refrigerating machine oil, containing the refrigerating machine oil described above and a refrigerant. The refrigerant may contain an unsaturated hydrofluorocarbon.

Advantageous Effects of Invention

According to one aspect of the present invention, a refrigerating machine oil having excellent antiwear property can be provided.

DESCRIPTION OF EMBODIMENTS

Hereinafter, embodiments of the present invention will be described in detail. The refrigerating machine oil according to one embodiment of the present invention contains a base oil and a partial ester of a carboxylic acid and a polyhydric alcohol. The partial ester (including both an unsaturated carboxylic acid partial ester and a saturated carboxylic acid partial ester, hereinafter, the term mere "partial ester" has the same meaning) is an ester in which a part of the hydroxyl groups of the polyhydric alcohol is esterified by carboxylic acid and the remaining part remains as hydroxyl groups without being esterified. That is, the partial ester has an ester bond and a hydroxyl group.

The base oil contains at least one selected from the group consisting of mineral oils and synthetic oils (excluding unsaturated carboxylic acid partial esters).

Examples of the mineral oil include mineral oils such as paraffinic mineral oils and naphthenic mineral oils, which are obtained by subjecting a lubricating oil fraction obtained by atmospheric distillation and vacuum distillation of crude oil to refining treatment such as solvent deasphalting, solvent extraction, hydrocracking, solvent dewaxing, catalytic dewaxing, hydrorefining, sulfuric acid washing, and clay treatment alone or in an appropriate combination of two or more thereof. In particular, the paraffinic mineral oils may be preferably used. These mineral oils may be used alone or in combination of two or more thereof at any ratio.

Examples of the synthetic oil include oxygen-containing synthetic oils such as esters other than the unsaturated carboxylic acid partial esters, ethers (such as polyvinyl ethers and polyalkylene glycols), carbonates, ketones, silicones, and polysiloxanes; and hydrocarbon synthetic oils such as alkylbenzenes, alkylnaphthalenes, poly-α-olefins (PAO), and ethylene-α-olefins. The oxygen-containing synthetic oil is preferably an ester other than the unsaturated carboxylic acid partial ester or an ether.

Examples of the ester other than the unsaturated carboxylic acid partial ester include a monobasic acid ester of a monobasic acid and a monohydric alcohol, a dibasic acid ester of a dibasic acid and a monohydric alcohol, a polyol ester of a carboxylic acid and a polyhydric alcohol, a complex ester, a carbonic acid ester, and a mixture thereof. The other ester is preferably a polyol ester of a carboxylic acid and a polyhydric alcohol (excluding the unsaturated carboxylic acid partial ester).

Examples of the polyol ester include a complete ester in which all the hydroxyl groups of a polyhydric alcohol are esterified with a saturated carboxylic acid or an unsaturated carboxylic acid, and a partial ester (saturated carboxylic acid partial ester) in which a part of the hydroxyl groups of a polyhydric alcohol is esterified with only a saturated carboxylic acid.

As the polyhydric alcohol constituting the polyol ester, a polyhydric alcohol having 2 to 6 hydroxyl groups is preferably used. The number of carbon atoms of the polyhydric alcohol is preferably 4 or more, more preferably 5 or more, and is preferably 12 or less, more preferably 10 or less. The polyhydric alcohol is preferably a hindered alcohol such as neopentyl glycol, trimethylolethane, trimethylolpropane, trimethylolbutane, di-(trimethylolpropane), tri-(trimethylolpropane), pentaerythritol or dipentaerythritol. From the viewpoint of compatibility with the refrigerant, the polyhydric alcohol is preferably any one of pentaerythritol, dipentaerythritol, and a mixture thereof.

The carboxylic acid constituting the complete ester may be a saturated carboxylic acid or an unsaturated carboxylic acid, and may be linear or branched. The number of carbon atoms of the carboxylic acid is preferably 4 or more, more preferably 6 or more, and even more preferably 8 or more, and is preferably 18 or less, more preferably 12 or less, and even more preferably 10 or less, and may be preferably 4 to 18, more preferably 6 to 12, and even more preferably 8 to 10.

Examples of the saturated carboxylic acid include pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, and octadecanoic acid. Examples of the unsaturated carboxylic acid include pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, and octadecenoic acid. The saturated carboxylic acid and the unsaturated carboxylic acid may be linear or branched.

The acid value of the oxygen-containing synthetic oil (preferably the ester or ether) may be, for example, 0.1 mgKOH/g or less, and is preferably 0.05 mgKOH/g or less. The hydroxyl value of the oxygen-containing synthetic oil (preferably the ester or ether) may be, for example, 10 mgKOH/g or less, and is preferably 5 mgKOH/g or less. When the acid value and the hydroxyl value are within the above ranges, the stability of the refrigerating machine oil when used together with an unsaturated hydrofluorocarbon refrigerant can be further improved. The acid value in the present specification means acid value measured in accordance with JIS K2501:2003. The hydroxyl value in the present specification means hydroxyl value measured in accordance with JIS K0070 "Test methods for acid value, saponification value, ester value, iodine value, hydroxyl value and unsaponifiable matter of chemical products".

The content of the base oil may be, for example, 50% by mass or more, 70% by mass or more, or 90% by mass or more, and may be 99% by mass or less, based on the total amount of the refrigerating machine oil.

The kinematic viscosity at 40° C. of the base oil is not particularly limited, but may be, for example, 3 mm$^2$/s or more, 10 mm$^2$/s or more, or 20 mm$^2$/s or more, and may be 500 mm$^2$/s or less or 300 mm$^2$/s or less. The kinematic viscosity at 100° C. of the base oil is not particularly limited, but may be, for example, 1 mm$^2$/s or more or 2 mm$^2$/s or more, and may be 100 mm$^2$/s or less or 50 mm$^2$/s or less. In the present specification, the kinematic viscosity means kinematic viscosity measured in accordance with JIS K2283:2000.

The carboxylic acid constituting the unsaturated carboxylic acid partial ester contains an unsaturated carboxylic acid having an unsaturated bond (carbon-carbon double bond). The number of unsaturated bonds in the unsaturated carboxylic acid may be, for example, 1 or more, 4 or less, 3 or less, or 2 or less, and may be 1.

The number of carbon atoms of the unsaturated carboxylic acid is preferably 4 or more, more preferably 8 or more, even more preferably 12 or more, and particularly preferably 16 or more, and is preferably 36 or less, more preferably 28 or less, and even more preferably 20 or less, and may be preferably 4 to 36, more preferably 8 to 28, even more preferably 12 to 20, and particularly preferably 14 to 18 or 16 to 20.

Examples of the unsaturated carboxylic acid include pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, and octadecenoic acid. Such an unsaturated carboxylic acid may be linear or branched. The unsaturated carboxylic acid particularly preferably contains oleic acid as a main component, and may contain an unsaturated fatty acid having 14 to 18 carbon atoms such as palmitoleic acid, linoleic acid, and linolenic acid.

As the polyhydric alcohol, a polyhydric alcohol having 2 to 6 hydroxyl groups is preferably used. The number of carbon atoms of the polyhydric alcohol is preferably 4 to 12, and more preferably 5 to 10. Specifically, hindered alcohols such as neopentyl glycol, trimethylolethane, trimethylolpropane, trimethylolbutane, di-(trimethylolpropane), tri-(trimethylolpropane), pentaerythritol, and dipentaerythritol are preferable. The polyhydric alcohol preferably contains pentaerythritol since the effect of improving antiwear property (lubricity) is particularly large.

In the unsaturated carboxylic acid partial ester, at least a part of the hydroxyl groups of the polyhydric alcohol may be esterified with the unsaturated carboxylic acid. That is, the partial ester includes the following (I) and (II):

(I) A compound in which a part of hydroxyl groups of the polyhydric alcohol is esterified with an unsaturated carboxylic acid, and the remaining part is not esterified and remains as a hydroxyl group;

(II) A compound in which a part of hydroxyl groups of the polyhydric alcohol is esterified with an unsaturated carboxylic acid, another part is esterified with a saturated carboxylic acid, and the remaining part is not esterified and remains as a hydroxyl group.

In the case (II), in other words, the carboxylic acid constituting the unsaturated carboxylic acid partial ester further contains a saturated carboxylic acid. The number of carbon atoms of the saturated carboxylic acid is preferably 4 or more, more preferably 8 or more, and even more preferably 12 or more, and is preferably 36 or less, more preferably 28 or less, and even more preferably 20 or less, and may be preferably 4 to 36, more preferably 8 to 28, even more preferably 12 to 20, and particularly preferably 14 to 18.

Specific examples of the saturated carboxylic acid include saturated carboxylic acids such as pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, and octadecanoic acid. Such a saturated carboxylic acid may be linear or branched.

For example, when the polyhydric alcohol is pentaerythritol, the unsaturated carboxylic acid partial ester may be one or more selected from a monoester in which one of four hydroxyl groups of pentaerythritol is esterified, a diester in which two of the hydroxyl groups are esterified, and a triester in which three of the hydroxyl groups are esterified.

The unsaturated carboxylic acid partial esters preferably contains the monoester, the diester and the triester. In this case, the proportion of the monoester in the unsaturated carboxylic acid partial ester may be 1% by mass or more, 5% by mass or more, or 8% by mass or more, and may be 30% by mass or less, 20% by mass or less, or 15% by mass or less. The proportion of the diester in the unsaturated carboxylic acid partial ester may be 20% by mass or more, 30% by mass or more, or 35% by mass or more, and may be 60% by mass or less, 50% by mass or less, or 45% by mass or less. The proportion of the triester in the unsaturated carboxylic acid partial ester may be 20% by mass or more, 30% by mass or more, or 35% by mass or more, and may be 65% by mass or less, 55% by mass or less, or 50% by mass or less.

The unsaturated bond-derived iodine value of the partial ester is preferably 20 ($gI_2/100$ g) or more, more preferably 40 ($gI_2/100$ g) or more, and still more preferably 50 ($gI_2/100$ g) or more. The iodine value is preferably 100 ($gI_2/100$ g) or less, more preferably 80 ($gI_2/100$ g) or less, and still more preferably 70 ($gI_2/100$ g) or less. The iodine value in the present specification is iodine value measured in accordance with the indicator titration method of JIS K0070 "Test methods for acid value, saponification value, ester value, iodine value, hydroxyl value and unsaponifiable matter of chemical products", and means a value ($gI_2/100$ g) obtained by converting the amount of bonded halogen into the number of grams of iodine when halogen is reacted with 100 g of sample.

The acid value of the unsaturated carboxylic partial ester is not particularly limited, but is preferably 5 mgKOH/g or less, may be 3 mgKOH/g or less or 2 mgKOH/g or less, may be 0.1 mgKOH/g or less, or may be 0.1 mgKOH/g or more, 0.4 mgKOH/g or more, or 1 mgKOH/g or more.

The hydroxyl value of the unsaturated carboxylic partial ester is not particularly limited, but may be, for example, 10 mgKOH/g or more, preferably 20 mgKOH/g or more, 50 mgKOH/g or more, or 100 mgKOH/g or more, and may be 500 mgKOH/g or less, preferably 300 mgKOH/g or less, or 200 mgKOH/g or less, due to the partial ester structure.

The content of the unsaturated carboxylic acid partial ester is preferably 0.001% by mass or more, more preferably 0.01% by mass or more, and even more preferably 0.1% by mass or more or 0.5% by mass or more, based on the total amount of the refrigerating machine oil, from the viewpoint of more suitably exhibiting the effect of improving antiwear property (lubricity). The content of the unsaturated carboxylic acid partial ester is preferably 10% by mass or less, more preferably 5% by mass or less, and still more preferably 1% by mass or less, from the viewpoint of compatibility with a refrigerant and from the viewpoint of further increasing the stability of the refrigerating machine oil.

The kinematic viscosity at 40° C. of the unsaturated carboxylic acid partial ester varies depending on the structure thereof, and is not particularly limited, but may be preferably 5 $mm^2/s$ or more or 10 $mm^2/s$ or more, and may be preferably 100 $mm^2/s$ or less, 50 $mm^2/s$ or less, or 30 $mm^2/s$ or less, from the viewpoint of excellent compatibility between the refrigerating machine oil and a refrigerant described below. The kinematic viscosity at 100° C. of the unsaturated carboxylic acid partial ester is not particularly limited, but may be preferably 1 $mm^2/s$ or more or 2 $mm^2/s$ or more, and may be 50 $mm^2/s$ or less, 10 $mm^2/s$ or less, or 8 $mm^2/s$ or less.

The viscosity index of the unsaturated carboxylic acid partial ester is not particularly limited, but may be, for example, 80 or more, 120 or more, or 150 or more, and may be 300 or less, 250 or less, or 200 or less. The viscosity index in the present specification means a viscosity index measured in accordance with JIS K2283:2000.

The refrigerating machine oil may further contain an additive other than the base oil and the unsaturated carboxylic acid partial ester. Examples of the additives include antioxidants, acid scavengers, antiwear agents, antifoaming agents, metal deactivators, viscosity index improvers, pour point depressants, and detergent dispersants.

Examples of the antioxidant include phenol-based antioxidants and amine-based antioxidants. Examples of the phenol-based antioxidant include 2,6-di-tert.-butyl-p-cresol (DBPC), 2,6-di-tert.-butyl-phenol, and 4,4'-methylenebis (2,6-di-tert.-butyl-phenol). Examples of the amine-based antioxidant include phenyl-α-naphthylamines and dialkylated diphenylamines. These antioxidants may be used alone or in combination of two or more thereof. The content of the antioxidant, for example, may be 0.01% by mass or more and may be 5% by mass or less, and preferably, may be 0.1% by mass or more and may be 3% by mass or less, based on the total amount of the refrigerating machine oil.

Examples of the acid scavenger include an epoxy compound (epoxy-based acid scavenger). Examples of the epoxy compound include glycidyl ether type epoxy compounds, glycidyl ester type epoxy compounds, aryloxirane compounds, alkyloxirane compounds, alicyclic epoxy compounds, epoxidized fatty acid monoesters, and epoxidized vegetable oils. The epoxy compound (epoxy-based acid scavenger) is preferably at least one selected from the group consisting of a glycidyl ether-type epoxy compound and a glycidyl ester-type epoxy compound, and is more preferably a glycidyl ether-type epoxy compound since the unsaturated carboxylic acid partial ester or a phosphorus-based antiwear agent described below can effectively function even at a low concentration. These acid scavengers may be used alone or in combination of two or more thereof. The content of the acid scavenger, for example, may be 0.01% by mass or more and may be 5% by mass or less, and preferably, may be 0.1% by mass or more and may be 3% by mass or less, based on the total amount of the refrigerating machine oil.

Examples of the antiwear agent include a phosphorus-based antiwear agent. Examples of the phosphorus-based antiwear agent include phosphate esters, acidic phosphate esters, amine salts of acidic phosphate esters, chlorinated phosphate esters, phosphite esters, and phosphorothionates. The phosphoric acid ester is preferably triphenyl phosphate (TPP), tricresyl phosphate (TCP), or triphenyl phosphorothionate (TPPT). The antiwear agent may be used alone or in combination of two or more. The content of the antiwear agent is preferably 0.01% by mass or more, more preferably 0.1% by mass or more, and even more preferably 1% by mass or more, and is preferably 5% by mass or less, and more preferably 3% by mass or less, based on the total amount of the refrigerating machine oil.

As the defoaming agent, any compound usually used as a defoaming agent for a refrigerating machine oil can be used, and examples thereof include silicones such as dimethyl silicone and fluorosilicone. The defoaming agent may be used alone or in combination of two or more thereof. The content of the defoaming agent is preferably 5% by mass or less, and more preferably 3% by mass or less, and is preferably 0.01% by mass or more, more preferably 0.1% by mass or more, and even more preferably 1% by mass or more, based on the total amount of the refrigerating machine oil.

Examples of the metal deactivator include benzotriazole and benzotriazole derivatives. The metal deactivator may be used alone or in combination of two or more. The content of the metal deactivator is preferably 5% by mass or less, more preferably 3% by mass or less, and is preferably 0.01% by mass or more, more preferably 0.1% by mass or more, and even more preferably 1% by mass or more, based on the total amount of the refrigerating machine oil.

Examples of the viscosity index improver include a non-dispersion type or dispersion type viscosity index improver. Specific examples thereof include non-dispersive or dispersive polymethacrylates, non-dispersive or dispersive ethylene-α-olefin copolymers or hydrogenated products thereof, polyisobutylene or hydrogenated products thereof, styrene-diene hydrogenated copolymers, polymethacrylate-olefin copolymers, and polyalkylstyrenes. These may be used alone or in combination of two or more thereof. The weight average molecular weight of these viscosity index improvers may be, for example, 10,000 or more and 1,000,000 or less. The content of the viscosity index improver is preferably 5% by mass or less, more preferably 3% by mass or less, preferably 0.01% by mass or more, more preferably 0.1% by mass or more, and even more preferably 1% by mass or more, based on the total amount of the refrigerating machine oil.

Examples of the pour point depressant include polyalkyl (meth)acrylates different from the viscosity index improvers. The content of the pour point depressant is preferably 5% by mass or less, more preferably 3% by mass or less, and is preferably 0.01% by mass or more, more preferably 0.1% by mass or more, and even more preferably 1% by mass or more, based on the total amount of the refrigerating machine oil.

As the detergent dispersant, a commonly used detergent dispersant can be used, and for example, succinimide, polyalkylamine, polyetheramine and the like can be used. These may be used alone or in combination of two or more. The content of the detergent dispersant is preferably 5% by mass or less, more preferably 3% by mass or less, and is preferably 0.01% by mass or more, more preferably 0.1% by mass or more, and even more preferably 1% by mass or more, based on the total amount of the refrigerating machine oil.

The kinematic viscosity at 40° C. of the refrigerating machine oil is not particularly limited as long as it is appropriately adjusted according to the purpose of use, and may be, for example, 3 mm$^2$/s or more, 10 mm$^2$/s or more, or 20 mm$^2$/s or more, and may be 500 mm$^2$/s or less or 300 mm$^2$/s or less. The kinematic viscosity at 100° C. of the refrigerating machine oil is not particularly limited, but may be, for example, 1 mm$^2$/s or more or 2 mm$^2$/s or more, and may be 100 mm$^2$/s or less or 50 mm$^2$/s or less.

The viscosity index of the refrigerating machine oil is not particularly limited, but may be, for example, 10 or more, 50 or more, or 70 or more, and 500 or less, 300 or less, or 250 or less.

The acid value of the refrigerating machine oil may be, for example, 0.1 mgKOH/g or less, and is preferably 0.05 mgKOH/g or less. The hydroxyl value of the refrigerating machine oil may be, for example, 10 mgKOH/g or less, and is preferably 5 mgKOH/g or less. When the acid value and the hydroxyl value are within the above ranges, the stability of the refrigerating machine oil when used together with an unsaturated hydrofluorocarbon refrigerant can be further improved.

The refrigerating machine oil according to the present embodiment is usually mixed with a refrigerant present in a state of a working fluid composition for a refrigerating machine oil in a refrigerating machine containing a refrigerant circulation system containing a compressor, a condenser, an expansion mechanism, and an evaporator, and lubricates, for example, a sliding member in the compressor. That is, another embodiment of the present invention is a working fluid composition for a refrigerating machine oil containing the refrigerating machine oil and a refrigerant.

The content of the refrigerating machine oil in the working fluid composition for a refrigerating machine oil may be 1 part by mass or more or 2 parts by mass or more, and may be 500 parts by mass or less or 400 parts by mass or less, with respect to 100 parts by mass of the refrigerant.

Examples of the refrigerant include, saturated hydrofluorocarbons, unsaturated hydrofluorocarbons, hydrocarbons, fluorine-containing ethers such as perfluoroethers, bis (trifluoromethyl) sulfide, trifluoroiodomethane, natural refrigerants such as ammonia and carbon dioxide, and mixed refrigerants of two or more selected from these refrigerants.

The saturated hydrofluorocarbon is a saturated hydrofluorocarbon having preferably 1 to 3 carbon atoms, more preferably 1 to 2 carbon atoms. Specific examples of the saturated hydrofluorocarbon include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The unsaturated hydrofluorocarbon is preferably an unsaturated hydrofluorocarbon having 2 to 4 or 2 to 3 carbon atoms, more preferably a fluoropropene, and still more preferably a fluoropropene having 3 to 5 fluorine atoms. The unsaturated hydrofluorocarbon refrigerant is preferably any one or a mixture of two or more of 1,2,3,3,3-pentafluoropropene (HFO-1225ye), 1333-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). The unsaturated hydrofluorocarbon is preferably one or two or more selected from HFO-1225ye, HFO-1234ze and HFO-1234yf from the viewpoint of refrigerant physical properties.

The hydrocarbon is preferably a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, normal-butane, iso-butane (R600a), cyclobutane, methylcyclopropane, 2-methylbutane, n-pentane, and a mixture of two or more thereof. Among these, the hydrocarbon is preferably a hydrocarbon which is gaseous at 25° C. and 1 atm, and more preferably propane, normal-butane, iso-butane, 2-methylbutane or a mixture thereof.

The refrigerating machine oil is preferably used together with a refrigerant containing an unsaturated hydrofluorocarbon, more preferably together with a refrigerant containing HFO-1234yf. That is, the refrigerant in the working fluid composition for a refrigerating machine oil preferably contains an unsaturated hydrofluorocarbon, and more preferably contains HFO-1234yf. The content of the unsaturated hydrofluorocarbon may be preferably 20% by mass or more, more preferably 60% by mass or more, even more preferably 70% by mass or more, and particularly preferably 80% by mass or more, based on the total amount of the refrigerant.

The refrigerating machine oil and working fluid composition for a refrigerating machine oil can be suitably used for refrigerating machines such as air conditioners, refrigerators, open or closed car air conditioners, dehumidifiers, water heaters, freezers, refrigerated warehouses, vending machines, showcases, and chemical plants, which have reciprocating or rotary hermetic compressors, and refrigerating machines having centrifugal compressors.

The refrigerating machine oil and working fluid composition for a refrigerating machine oil lubricate the sliding members in the compressor. The sliding member preferably contains aluminium. The refrigerating machine oil can particularly suitably lubricate a combination of a sliding member containing iron and a sliding member containing aluminum.

EXAMPLES

Hereinafter, the present invention will be described in more detail based on examples, but the present invention is not limited to the following examples.

[Refrigerating Machine Oil]

The following components were used to prepare refrigerating machine oils having the compositions (% by mass based on the total amount of the refrigerating machine oil) shown in Table 1. All of the refrigerating machine oils had an acid value of 0.05 mgKOH/g or less and a hydroxyl value of 5 mgKOH/g or less.

(A) a base oil obtained by mixing the following a1 and a2 at a mass ratio of 75/25 (kinematic viscosity at 40° C.: 83.29 mm²/s, kinematic viscosity at 100° C.: 9.63 mm²/s, acid value: 0.05 mgKOH/g or less, hydroxyl value: 5 mgKOH/g or less)

a1: complete ester of pentaerythritol and mixed carboxylic acid of 2-ethylhexanoic acid/3,5,5-trimethylhexanoic acid (mixing ratio (mass ratio): 48/52)

a2: complete ester of dipentaerythritol and mixed carboxylic acid of 2-ethylhexanoic acid/3,5,5-trimethylhexanoic acid (mixing ratio (mass ratio): 50/50)

(B) mixture of partial esters (monoester: 10% by mass, diester: 37% by mass, triester: 40% by mass) of pentaerythritol and mixed carboxylic acids having 14 to 18 carbon atoms and containing octadecenoic acid and hexadecanoic acid as main components (octadecenoic acid: 87% by mass, hexadecanoic acid: 5% by mass, other carboxylic acids: 8% by mass); and complete esters (13% by mass) of pentaerythritol and mixed carboxylic acids having 14 to 18 carbon atoms and containing octadecenoic acids and hexadecanoic acids as main components (octadecenoic acid: 87% by mass, hexadecanoic acid: 5% by mass, other carboxylic acids: 8% by mass) (iodine value: 66.3 (gI$_2$/100 g), acid value: 1.5 mgKOH/g, hydroxyl value: 130 mgKOH/g, kinematic viscosity at 40° C.: 12.5 mm²/s, kinematic viscosity at 100° C.: 3.6 mm²/s, viscosity index: 190)

(b1) complete esters of pentaerythritol and mixed carboxylic acid having 14 to 18 carbon atoms and containing octadecenoic acid and hexadecanoic acid as main components (octadecenoic acid: 88% by mass, hexadecanoic acid: 5% by mass, other carboxylic acids: 7% by mass) (iodine value: 88 (gI$_2$/100 g), acid value: 0.4 mgKOH/g, hydroxyl value: 6 mgKOH/g, kinematic viscosity at 40° C.: 66 mm²/s, kinematic viscosity at 40° C.: 100° C.: 12.5 mm²/s, viscosity index: 188)

(b2) mixture of partial esters of trimethylolpropane and decanoic acid (monoester: 27% by mass, diester: 46% by mass); and a complete ester of trimethylolpropane and decanoic acid (27% by mass)

(C) phosphorus-based antiwear agent (D) epoxy-based acid scavenger (D1) glycidyl ester-type epoxy compound (D2) glycidyl ether-type epoxy compound (E) phenol-based antioxidant

[Evaluation of Antiwear Property]

A sealed FALEX tester (pin: 3135 steel (sliding member containing iron), V block: 4032 Al (sliding member containing aluminum)) was used, and the test conditions were test load of 0.3 MPaG, test time of 5 hours, rotation speed of 290 rpm, and test temperature of 25° C. (room temperature). A test piece conforming to the ASTM D2670 wear amount test was used as the test piece, an antiwear property test was performed under 2,3,3,3-tetrafluoropropene refrigerant blowing environment (refrigerant blowing amount: 10 L/h), and the mean value of block wear widths (mm) after the test was measured. The results are shown in Table 1. In Table 1, the smaller the wear width, the better the antiwear property.

TABLE 1

|  |  | Example 1 | Example 2 | Example 3 | Comparative Example 1 | Comparative Example 2 | Comparative Example 3 |
|---|---|---|---|---|---|---|---|
| Composition (% by mass) | (A) | Remainder | Remainder | Remainder | Remainder | Remainder | Remainder |
|  | (B) | 1.0 | 0.5 | 0.5 | — | — | — |
|  | (b1) | — | — | — | — | 1.0 | — |
|  | (b2) | — | — | — | — | — | 1.0 |
|  | (C) | 2.0 | 2.0 | 2.0 | 2.0 | 2.0 | 2.0 |
|  | (D1) | 0.5 | 0.5 | — | 0.5 | 0.5 | 0.5 |
|  | (D2) | — | — | 0.5 | — | — | — |
|  | (E) | 0.3 | 0.3 | 0.3 | 0.3 | 0.3 | 0.3 |
| Block wear width (mm) |  | 0.24 | 0.27 | 0.23 | 0.45 | 0.53 | 0.48 |

The invention claimed is:

1. A working fluid composition for a refrigerating machine, comprising:
   a refrigerating machine oil; and
   a refrigerant comprising an unsaturated hydrofluorocarbon,
   wherein the refrigerating machine oil comprises:
   a base oil comprising a mixture of polyol esters of a saturated carboxylic acid having 4 to 10 carbon atoms and a polyhydric alcohol selected from pentaerythritol, dipentaerythritol, and a mixture thereof; and
   a partial ester of a carboxylic acid and pentaerythritol;
   wherein
      the carboxylic acid comprises an unsaturated carboxylic acid having 14 to 18 carbon atoms,
      the partial ester comprises a monoester of pentaerythritol, a diester of pentaerythritol, and a triester of pentaerythritol,
      the partial ester has a hydroxyl value of 20 mgKOH/g or more, and
      a content of the base oil is 90% by mass or more, and a content of the partial ester is 0.1 to 5% by mass, based on a total amount of the refrigerating machine oil.

2. The working fluid composition according to claim 1, wherein
   the monoester of pentaerythritol is a monoester of pentaerythritol with a carboxylic acid having 14 to 18 carbon atoms and comprising octadecenoic acid,
   the diester of pentaerythritol is a diester of pentaerythritol with a carboxylic acid having 14 to 18 carbon atoms and comprising octadecenoic acid, and
   the triester of pentaerythritol is a triester of pentaerythritol with a carboxylic acid having 14 to 18 carbon atoms and comprising octadecenoic acid.

3. The working fluid composition according to claim 1, wherein the partial ester has a hydroxyl value of 50 mgKOH/g or more.

4. The working fluid composition according to claim 2, wherein the carboxylic acid having 14 to 18 carbon atoms further comprises hexadecanoic acid.

5. The working fluid composition according to claim 1, wherein a proportion of the monoester in the partial ester is 1% by mass or more and 30% by mass or less.

6. The working fluid composition according to claim 1, wherein a proportion of the diester in the partial ester is 20% by mass or more and 60% by mass or less.

7. The working fluid composition according to claim 1, wherein a proportion of the triester in the partial ester is 20% by mass or more and 65% by mass or less.

8. The working fluid composition according to claim 1, wherein a proportion of the monoester in the partial ester is 1% by mass or more and 30% by mass or less, a proportion of the diester in the partial ester is 20% by mass or more and 60% by mass or less, and a proportion of the triester in the partial ester is 20% by mass or more and 65% by mass or less.

9. The working fluid composition according to claim 1, wherein the partial ester has an unsaturated bond-derived iodine value of 20 (gI2/100 g) or more and 100 (gI2/100 g) or less.

10. The working fluid composition according to claim 1, wherein the partial ester has an acid value of 5 mgKOH/g or less.

11. The working fluid composition according to claim 1, wherein the refrigerating machine oil further comprises 0.1 to 5% by mass of a phosphorus-based antiwear agent.

12. The working fluid composition according to claim 1, wherein the refrigerating machine oil further comprises 0.1 to 5% by mass of an epoxy-based acid scavenger selected from a glycidyl ester-type epoxy compound and a glycidyl ether-type epoxy compound.

13. The working fluid composition according to claim 1, wherein the refrigerating machine oil further comprises 0.1 to 3% by mass of a phenol-based antioxidant.

14. The working fluid composition according to claim 1, wherein the unsaturated hydrofluorocarbon comprises one or more selected from HFO-1225ye, HFO-1234ze and HFO-1234yf.

* * * * *